(12) United States Patent
Vargo et al.

(10) Patent No.: US 10,488,077 B2
(45) Date of Patent: Nov. 26, 2019

(54) FURNACE INDUCER ELBOW, GAS FURNACE SYSTEM HAVING ELBOW, AND METHOD OF MANUFACTURING ELBOW

(71) Applicant: Carrier Corporation, Farmington, CT (US)

(72) Inventors: Mathew S. Vargo, Indianapolis, IN (US); John N. Abel, Avon, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 482 days.

(21) Appl. No.: 15/177,059

(22) Filed: Jun. 8, 2016

(65) Prior Publication Data

US 2016/0363346 A1 Dec. 15, 2016

Related U.S. Application Data

(60) Provisional application No. 62/175,679, filed on Jun. 15, 2015.

(51) Int. Cl.
| | |
|---|---|
| F24H 8/00 | (2006.01) |
| B29D 23/00 | (2006.01) |
| F16L 43/00 | (2006.01) |
| F24H 9/14 | (2006.01) |
| B29K 23/00 | (2006.01) |
| B29K 21/00 | (2006.01) |
| B29L 31/24 | (2006.01) |

(52) U.S. Cl.
CPC ........... *F24H 8/006* (2013.01); *B29D 23/006* (2013.01); *F16L 43/008* (2013.01); *F24H 9/146* (2013.01); *B29K 2021/003* (2013.01); *B29K 2023/12* (2013.01); *B29L 2031/243* (2013.01); *Y02B 30/106* (2013.01)

(58) Field of Classification Search
None
See application file for complete search history.

(56) References Cited

U.S. PATENT DOCUMENTS

| | | | | |
|---|---|---|---|---|
| 568,537 | A * | 9/1896 | Laubsch | ................ F16L 27/111 |
| | | | | 285/114 |
| 665,171 | A * | 1/1901 | Brownfield | ................... 248/351 |

(Continued)

OTHER PUBLICATIONS

"Gasket Kit" by Carrier Corporation, 1994, included as file: hvac_gasket_adhesive_1994.pdf (Year: 1994).*

*Primary Examiner* — Avinash A Savani
*Assistant Examiner* — Martha M Becton
(74) *Attorney, Agent, or Firm* — Cantor Colburn LLP

(57) ABSTRACT

A furnace inducer elbow in accordance with one, non-limiting embodiment of the present disclosure includes a main body section having a first opening and a second opening arranged at a non-zero angle from the first opening, the main body section made of a first material; and, a sealing section integrally connected to the main body section at the first opening and at the second opening, the sealing section made of a second material different from the first material, wherein the second material is more flexible than the first material; wherein the sealing section includes an inlet aligned with the first opening and configured to seal to a flue vent connection member of an inducer fan assembly, and the sealing section further including an outlet aligned with the second opening and configured to seal to a flue vent.

14 Claims, 7 Drawing Sheets

(56) References Cited

U.S. PATENT DOCUMENTS

| | | | | |
|---|---|---|---|---|
| 953,707 | A * | 4/1910 | Pearce | F16L 3/14 126/318 |
| 1,122,632 | A * | 12/1914 | Phelps | F16L 17/04 174/650 |
| 1,211,784 | A * | 1/1917 | Stuart | F16L 57/06 406/193 |
| 1,359,127 | A * | 11/1920 | Tedder | 126/318 |
| 3,185,506 | A | 8/1963 | Szlashta | |
| 3,290,066 | A | 9/1963 | Primich et al. | |
| 4,059,293 | A * | 11/1977 | Sipler | F16L 27/11 285/179 |
| 4,481,935 | A | 11/1984 | Bawel | |
| 4,494,598 | A * | 1/1985 | DeHaan | F24H 8/006 165/178 |
| 4,603,680 | A | 8/1986 | Dempsey et al. | |
| 4,653,466 | A * | 3/1987 | DeHaan | F24H 8/006 126/110 R |
| 4,889,168 | A * | 12/1989 | Kerzich | F16L 35/00 138/103 |
| 4,899,726 | A | 2/1990 | Waterman | |
| 5,046,478 | A | 9/1991 | Clawson | |
| 5,178,124 | A | 1/1993 | Lu et al. | |
| 5,257,904 | A | 11/1993 | Sullivan | |
| D342,782 | S | 12/1993 | Anderson et al. | |
| 5,322,050 | A | 6/1994 | Lu | |
| 5,341,795 | A | 8/1994 | Chou et al. | |
| 5,379,751 | A | 1/1995 | Larsen et al. | |
| 5,443,364 | A | 8/1995 | Mistry et al. | |
| 5,547,232 | A | 8/1996 | Waterman | |
| 5,584,129 | A * | 12/1996 | Williamson | D06F 58/20 34/134 |
| 5,775,318 | A | 7/1998 | Haydock et al. | |
| 5,957,506 | A * | 9/1999 | Stepp | F16L 43/00 285/183 |
| 6,161,310 | A | 12/2000 | Tuggle et al. | |
| 6,227,191 | B1 * | 5/2001 | Garloch | F23L 17/005 126/110 R |
| 6,305,369 | B1 * | 10/2001 | Garloch | F23L 17/005 126/116 A |
| 6,341,949 | B1 | 1/2002 | Garloch | |
| 6,354,937 | B1 * | 3/2002 | Crook | F24F 13/0209 138/106 |
| 6,450,551 | B1 * | 9/2002 | Lee | F16L 17/04 285/373 |
| 6,470,878 | B1 * | 10/2002 | Brown | F24H 3/105 126/110 R |
| 6,484,798 | B1 * | 11/2002 | Manohar | F24H 3/105 165/170 |
| 6,494,199 | B1 * | 12/2002 | Zia | A21B 3/02 126/110 R |
| 6,536,378 | B2 | 3/2003 | Lyons | |
| 6,729,586 | B2 | 5/2004 | Arguijo et al. | |
| 6,793,015 | B1 * | 9/2004 | Brown | F23C 3/002 165/170 |
| 6,837,787 | B2 * | 1/2005 | Crook | F24F 13/0209 138/106 |
| 6,851,948 | B2 * | 2/2005 | Dempsey | F23D 14/72 431/18 |
| 7,096,933 | B1 * | 8/2006 | Zia | F24H 3/105 165/170 |
| 7,354,244 | B2 | 4/2008 | Hasbargen et al. | |
| D580,543 | S * | 11/2008 | Crook | D23/393 |
| 7,644,956 | B2 * | 1/2010 | Crook | F16L 35/00 285/114 |
| 7,914,047 | B2 * | 3/2011 | Crook | F16L 3/1226 285/24 |
| 8,038,175 | B2 * | 10/2011 | Crook | F16L 3/02 248/316.1 |
| D658,831 | S | 5/2012 | Robinson et al. | |
| 8,641,411 | B2 * | 2/2014 | Crawley | F01N 3/0256 422/187 |
| 9,556,989 | B2 * | 1/2017 | O'Neil | F16L 43/02 |
| 10,012,258 | B2 * | 7/2018 | Lambert | F16B 39/00 |
| 10,240,692 | B2 * | 3/2019 | Won | F16L 3/1016 |
| 2003/0070672 | A1 | 4/2003 | Ho et al. | |
| 2005/0126558 | A1 | 6/2005 | Riepenhoff et al. | |
| 2005/0150211 | A1 * | 7/2005 | Crawley | F01N 3/0256 60/282 |
| 2010/0031527 | A1 * | 2/2010 | Robinson | D06F 58/20 34/235 |
| 2012/0085334 | A1 * | 4/2012 | Beck | F24H 3/087 126/114 |
| 2012/0090590 | A1 | 4/2012 | Rieke et al. | |

* cited by examiner

FURNACE INDUCER ELBOW, GAS FURNACE SYSTEM HAVING ELBOW, AND METHOD OF MANUFACTURING ELBOW

CROSS-REFERENCE TO RELATED APPLICATIONS

This application claims the benefit of U.S. provisional patent application Ser. No. 62/175,679, filed Jun. 15, 2015, the entire contents of which are incorporated herein by reference.

BACKGROUND

Embodiments of this disclosure pertain to the art of gas furnace systems and, more particularly, to a furnace inducer elbow for a gas furnace system.

Gas furnace systems burn a gas fuel to generate heat. Exhaust gases generated by burning the fuel are passed through a chimney or flue and discharged to, in most cases, ambient. In the flue, the exhaust gases cool and form a liquid condensate. It is desirable to remove the liquid condensate from the flue in order to minimize flue blockage, diminished inducer fan performance, diminished performance of other furnace components, and/or rusting and other corrosion effects on portions of the gas furnace system. Condensate flowing back from the flue passes back towards an inducer fan housing. A rubber pipe elbow is used to couple the flue to the inducer fan assembly. The condensate is collected with a pipe tee or drain channels formed in the housing of the inducer fan. The condensate is then passed through elastomeric piping to a condensate trap or drain.

BRIEF DESCRIPTION

A furnace inducer elbow in accordance with one, non-limiting embodiment of the present disclosure includes a main body section having a first opening and a second opening arranged at a non-zero angle from the first opening, the main body section made of a first material; and, a sealing section integrally connected to the main body section at the first opening and at the second opening, the sealing section made of a second material different from the first material, wherein the second material is more flexible than the first material; wherein the sealing section includes an inlet aligned with the first opening and configured to seal to a flue vent connection member of an inducer fan assembly, and the sealing section further including an outlet aligned with the second opening and configured to seal to a flue vent.

Additionally to the foregoing embodiment, the first material may also include a substantially inflexible plastic.

In any of the foregoing embodiments, the first material may also include polypropylene.

In any of the foregoing embodiments, the second material may also include a flexible plastic, having greater flexibility than the substantially inflexible plastic of the first material.

In any of the foregoing embodiments, the second material may also include a thermoplastic elastomer.

In any of the foregoing embodiments, the sealing section may also include a first section integrally connected to the main body section at the first opening, and a second section integrally connected to main body section at the second opening, the first section integrally connected to the second section.

In any of the foregoing embodiments, the sealing section may also include a first section integrally connected to the main body section at the first opening, and a second section integrally connected to the main body section at the second opening, the first section disconnected from the second section.

In any of the foregoing embodiments, a centerline of the inlet may not intersect with a centerline of the outlet.

In any of the foregoing embodiments, the non-zero angle may be at least substantially equal to 90 degrees.

In any of the foregoing embodiments, the sealing section may also include a first section at the first opening and a second section at the second opening, and may further include a first bonded area between the first section and the main body section and a second bonded area between the second section and the main body section, wherein the first and second bonded areas may include a combination of the first and second materials, and the first and second bonded areas are less flexible than the sealing section.

A gas furnace system in accordance with one, non-limiting embodiment of the present disclosure includes a heat exchanger; an inducer fan assembly mounted to the heat exchanger, the inducer fan assembly having an inducer fan housing including a flue vent connection member configured and disposed to be connected to an exhaust gas flue vent, the flue vent connection member including a flue gas outlet and a flue vent condensate inlet; and a furnace inducer elbow mounted to the flue vent connection member, the furnace inducer elbow including a main body section having a first opening and a second opening arranged at a non-zero angle from the first opening, the main body section made of a first material, and a sealing section integrally connected to the main body section at the first opening and at the second opening, the sealing section made of a second material different from the first material, the second material more flexible than the first material; wherein the sealing section includes an elbow inlet aligned with the first opening and sealed to the flue vent connection member of the inducer fan assembly, and the sealing section further includes an elbow outlet aligned with the second opening and configured to seal to the flue vent.

In any of the foregoing embodiments, the first material may also include a substantially inflexible plastic.

In any of the foregoing embodiments, the second material may also include a flexible plastic, having greater flexibility than the substantially inflexible plastic of the first material.

In any of the foregoing embodiments, the sealing section may also include a first section integrally connected to the main body section at the first opening, and a second section integrally connected to main body section at the second opening, the first section integrally connected to the second section.

In any of the foregoing embodiments, a centerline of the elbow inlet may not intersect with a centerline of the elbow outlet.

In any of the foregoing embodiments, the non-zero angle may be substantially equal to 90 degrees.

A method of manufacturing a furnace inducer elbow according to another, non-limiting embodiment includes molding a first material into a tubular shape having a main body section with a first opening and a second opening, the first opening arranged at a non-zero angle from the second opening; and molding a second material, having greater flexibility than the first material, into a sealing section, wherein the sealing section is molded onto the main body section and partially melts a portion of the main body section at the first opening and at the second opening, a portion of the second material of the sealing section combining with a portion of the first material of the main body section to form a first bonded area and a second bonded area, the first and second bonded areas having less flexibility than the second material.

In the alternative or additionally thereto, molding the second material into the sealing section may also include molding a first section at the first opening and a second section at the second opening, and integrally connecting the first section to the second section during the molding of the second material into the sealing section.

In any of the foregoing embodiments, molding the second material into the sealing section may include molding a first section at the first opening and a second section, separate from the first section, at the second opening.

In any of the foregoing embodiments, molding the first material into the main body section may include utilizing a substantially inflexible plastic as the first material, and molding the second material into the sealing section includes utilizing a flexible plastic, having greater flexibility than the substantially inflexible plastic of the first material, as the second material.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures. With reference to the accompanying drawings, like elements are numbered alike.

Figure 1:
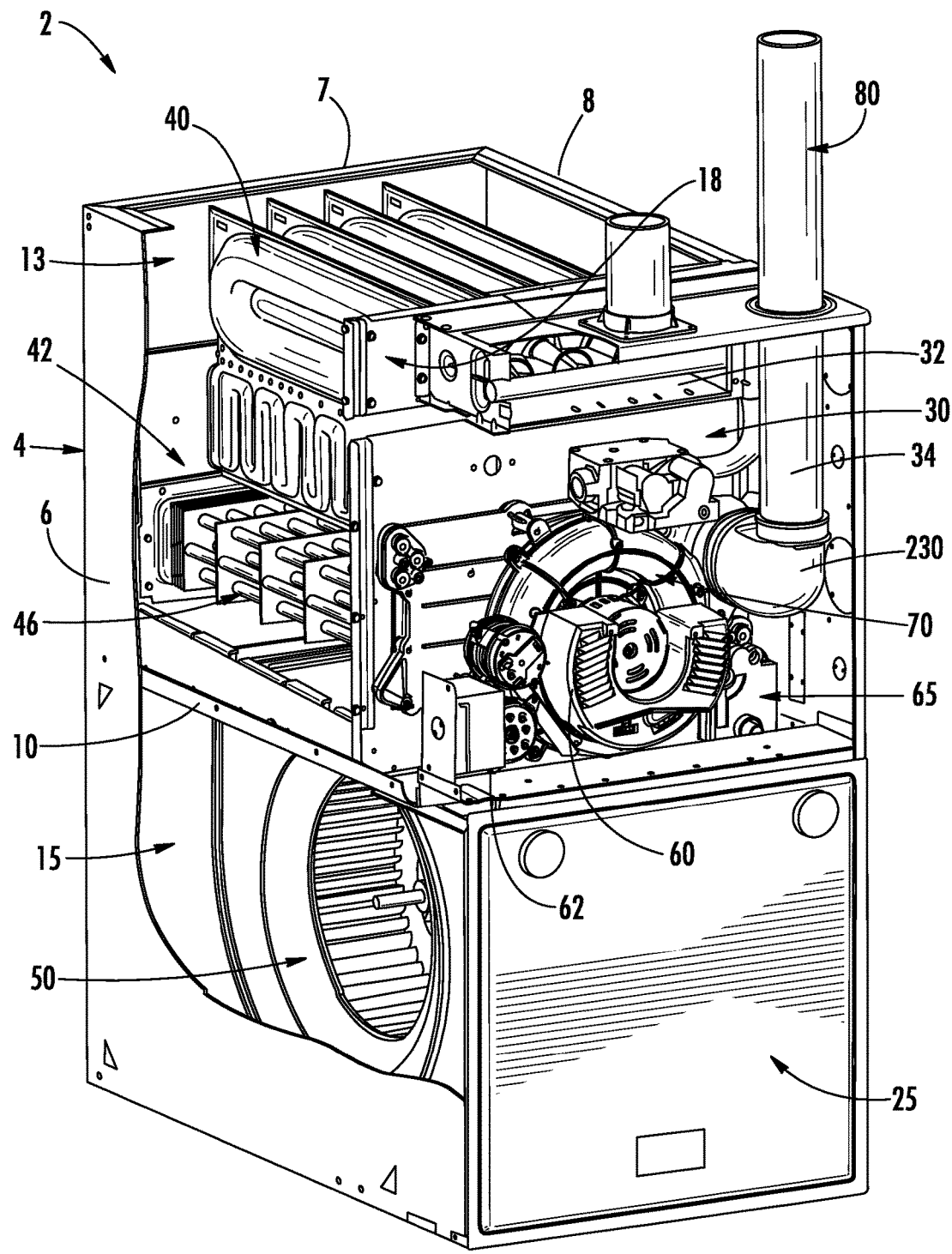
FIG. 1 is a perspective view of a gas furnace system including a furnace inducer elbow in accordance with an embodiment of this disclosure.

With reference to FIG. 1, a gas furnace system in accordance with an embodiment is indicated generally at 2. Gas furnace system 2 includes a housing 4 having a plurality of exterior walls 6-8 and an interior dividing wall 10 that forms a heat exchange portion 13 and a blower portion 15. Heat exchange portion 13 includes a component support wall 18 which, as will be discussed more fully below, provides structure for mounting various components of the gas furnace system 2. Housing 4 is also shown to include an access panel 25 that provides access to blower portion 15 and another access panel (not shown) that provides access to heat exchange portion 13.

Gas furnace system 2 is also shown to include a burner assembly 30 mounted to component support wall 18. Burner assembly 30 includes a burner box 32 and a gas valve 34. Burner assembly 30 combusts a fuel, in the form of gas to generate heat used to condition a comfort zone such as living spaces, work spaces and the like. As will be discussed more fully below, products of combustion or exhaust gases generated by the burning of the fuel are expelled to ambient. In the embodiment shown, burner assembly 30 is operatively connected to a primary heat exchanger 40 arranged within heat exchange portion 13. Primary heat exchanger 40 is operatively coupled to a condensing heat exchanger 42. Condensing heat exchanger 42 includes a plurality of heat exchange members 46. With this arrangement, a blower motor assembly 50 arranged within blower portion 15 draws in air from a space to be heated. The air is guided over primary heat exchanger 40, and heat exchange members 46 of condensing heat exchanger 42. The air is heated and then re-introduced into the space.

During operation of gas furnace system 2, moisture from the products of combustion condenses in condensing heat exchanger 42. This moisture is collected and then passed to an external drain (not shown). The moisture is guided to a condensate collector box 60. Condensate collector box 60 includes a first surface 62 and a second surface (not separately labeled) that is secured to component support wall 18. The moisture is collected in condensate collector box 60, passed to a condensate trap 65, and on to the external drain. In accordance with the embodiment shown, an inducer fan assembly 70 is mounted to first surface 62 of condensate collection box 60. Inducer fan assembly 70 creates an air flow that establishes a draft which draws the products of combustion from burner box 32 as will be discussed more fully below. More specifically, inducer fan assembly 70 produces a pressure rise and flow rate to achieve a desired combustion performance while overcoming flow losses within gas furnace system 2.

Figure 2:
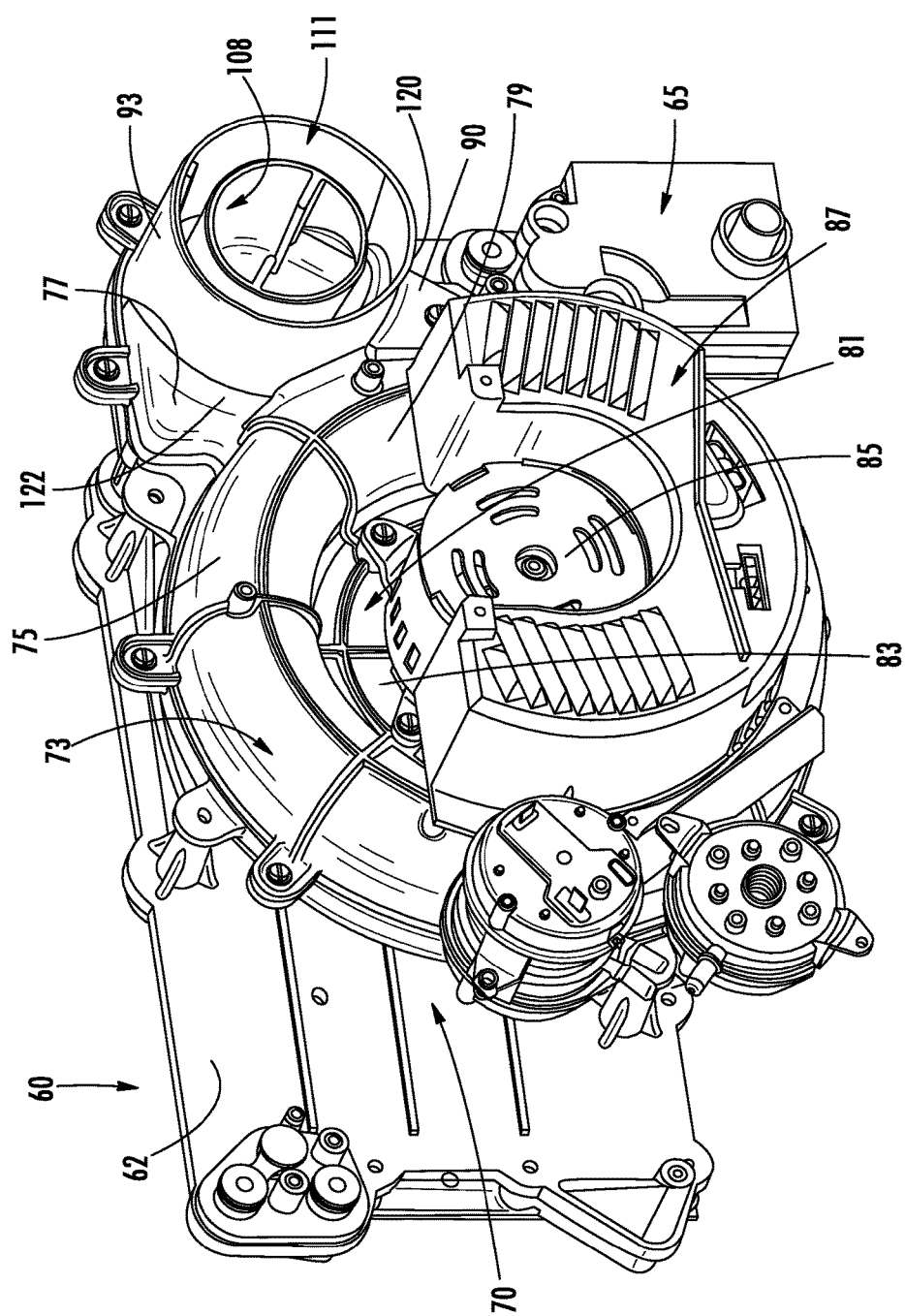
FIG. 2 is a perspective view of a prior art inducer fan assembly and collector box usable in the gas furnace system of FIG. 1.

As best shown in FIG. 2, inducer fan assembly 70 includes an inducer fan housing 73 having a fan portion 75 and a flue vent connecting portion 77 that is operatively connected to a flue vent 80. Fan portion 75 includes an annular flow guide 79 that defines a recessed region 81 having a motor support surface 83. A motor 85 is secured to motor support surface 83 and operatively connected to a rotor fan (not shown) arranged within inducer fan housing 73. Motor 85 defines an axis of rotation for a rotor fan (not shown). In the exemplary embodiment shown, motor 85 is operatively connected to a motor control 87 that establishes a desired operational speed for the rotor fan. Fan portion 75 is fluidly connected to flue vent connecting portion 77 via a discharge passage 90.

As further shown in FIG. 2, flue vent connecting portion 77 includes a flue vent connecting member 93 that extends outward from inducer fan housing 73 parallel to the axis of rotation of the rotor fan. Flue vent connecting member 93 includes a flue gas outlet 108 and a flue vent condensate inlet 111. In accordance with the exemplary embodiment, flue gas outlet 108 is arranged concentrically inward from flue vent condensate inlet 111. With this arrangement, flue vent connecting portion 77 provides passage for exhaust or flue gases from burner box 32 and also includes a collection zone 120 that receives condensate that may form in flue vent 80. In other orientations, a collection zone 122 is established. Although shown arranged concentrically, other arrangements, including eccentric arrangements may also be included.

Figure 3:
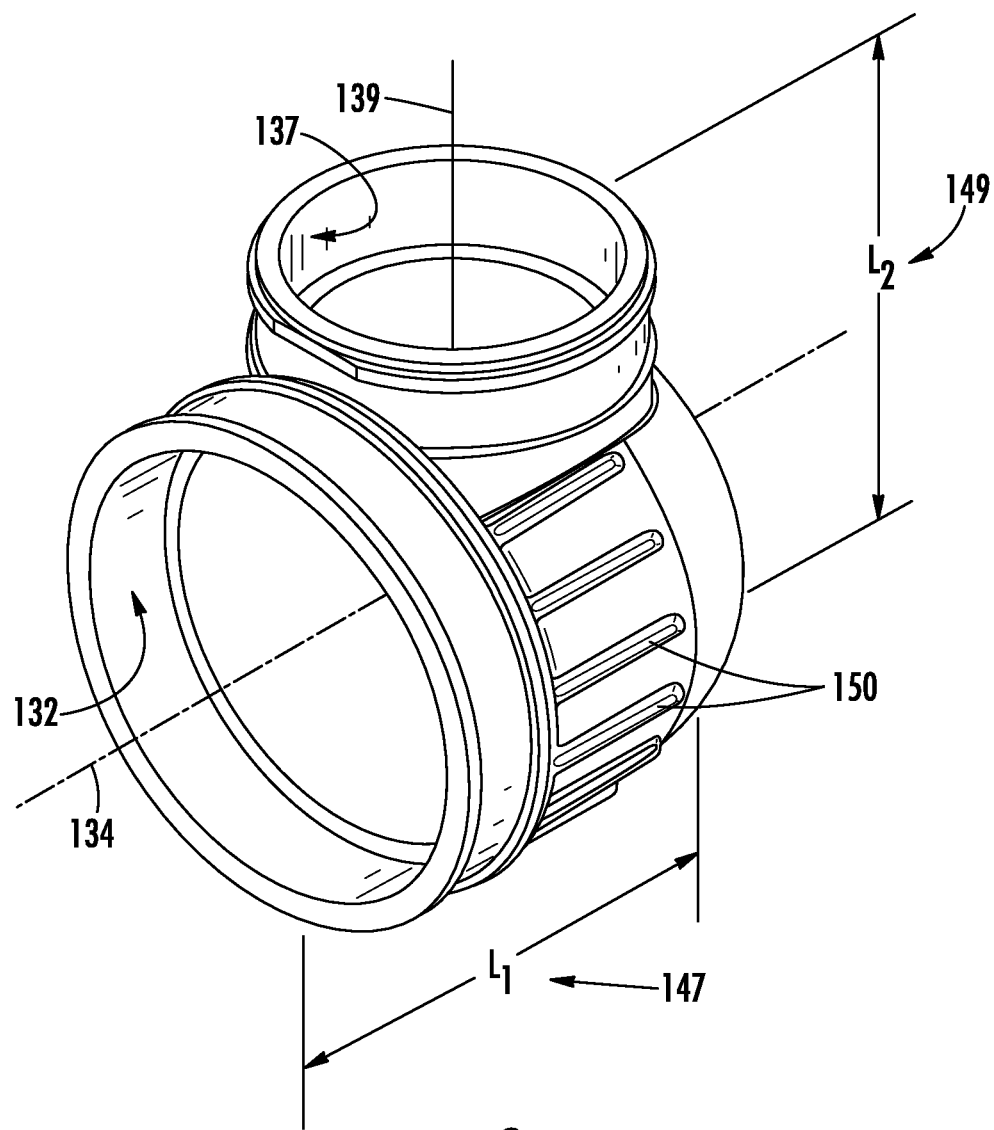
FIG. 3 is a perspective view of a prior art pipe elbow that is configured to be connected to the inducer fan assembly of FIG. 2.

In further accordance with an embodiment, flue vent discharge portion 77 is coupled to flue vent 80 through a furnace inducer elbow 230 as shown in FIG. 1. The furnace inducer elbow 230 is shown in greater detail in FIGS. 4-10, and further described below. In contrast, a pipe elbow 130 according to the prior art is shown in FIG. 3 and includes an inlet member 132 having an inlet member centerline 134, and an outlet member 137 having an outlet member centerline 139. Pipe elbow 130 includes a first length 147 from inlet member 132 to a rear portion of the 90° bend, and a second length 149 from outlet member 137 to the back of the 90° bend. The pipe elbow 130 is typically a one-piece unit integrally formed of a rubber material. The integral pipe elbow 130 is strengthened by thick walls and external support ribs 150 to support the load of the flue vent 80, and the rubber material provides the sealing between the flue vent discharge portion 77 and flue vent 80 with the necessary chemical compatibility with the acidic liquid condensate.

Figure 4:
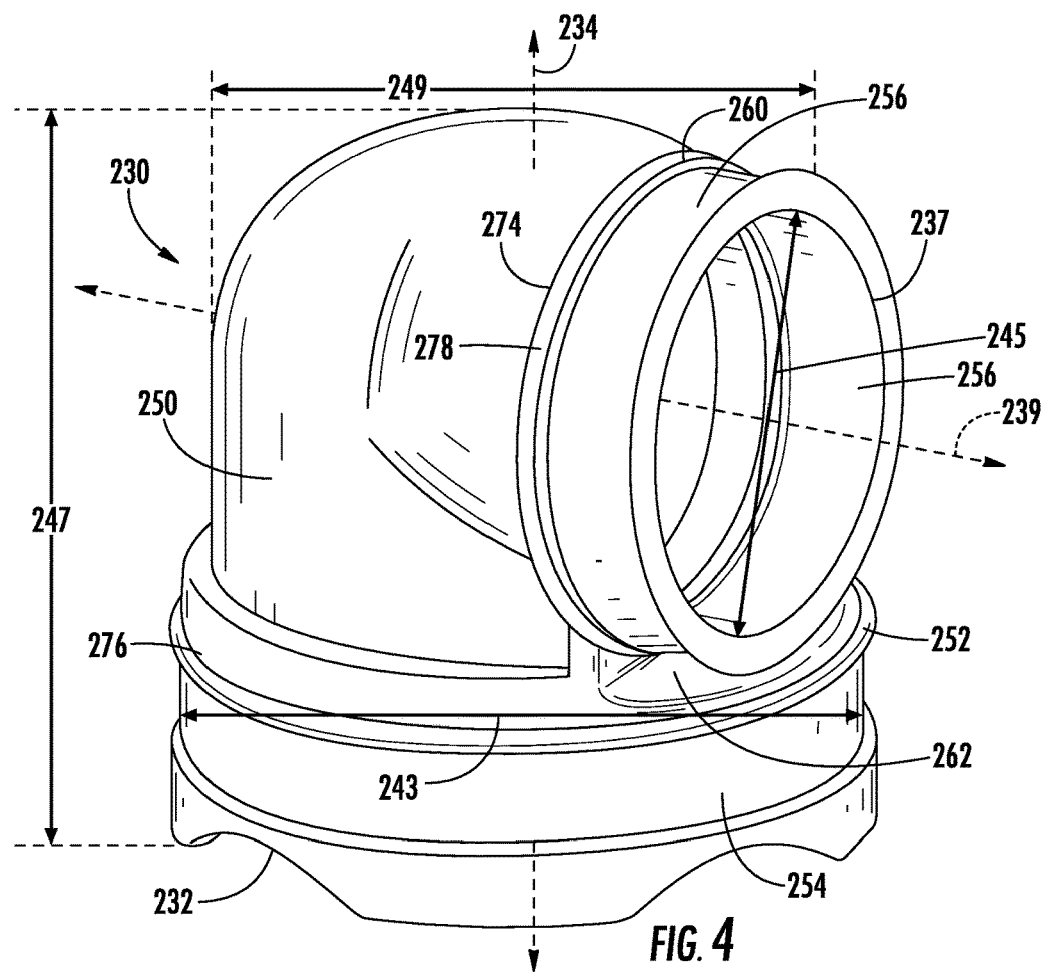
FIG. 4 is a perspective view of a furnace inducer elbow in accordance with an embodiment of this disclosure that is configured to be connected to the inducer fan assembly of FIG. 2.
Figure 5:
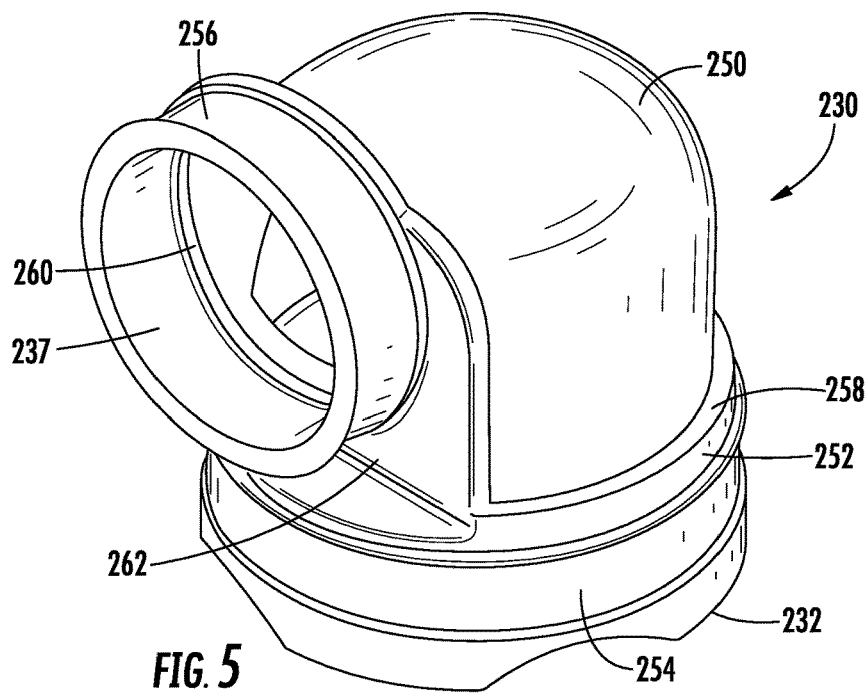
FIG. 5 is another perspective view of the furnace inducer elbow of FIG. 4.
Figure 6:
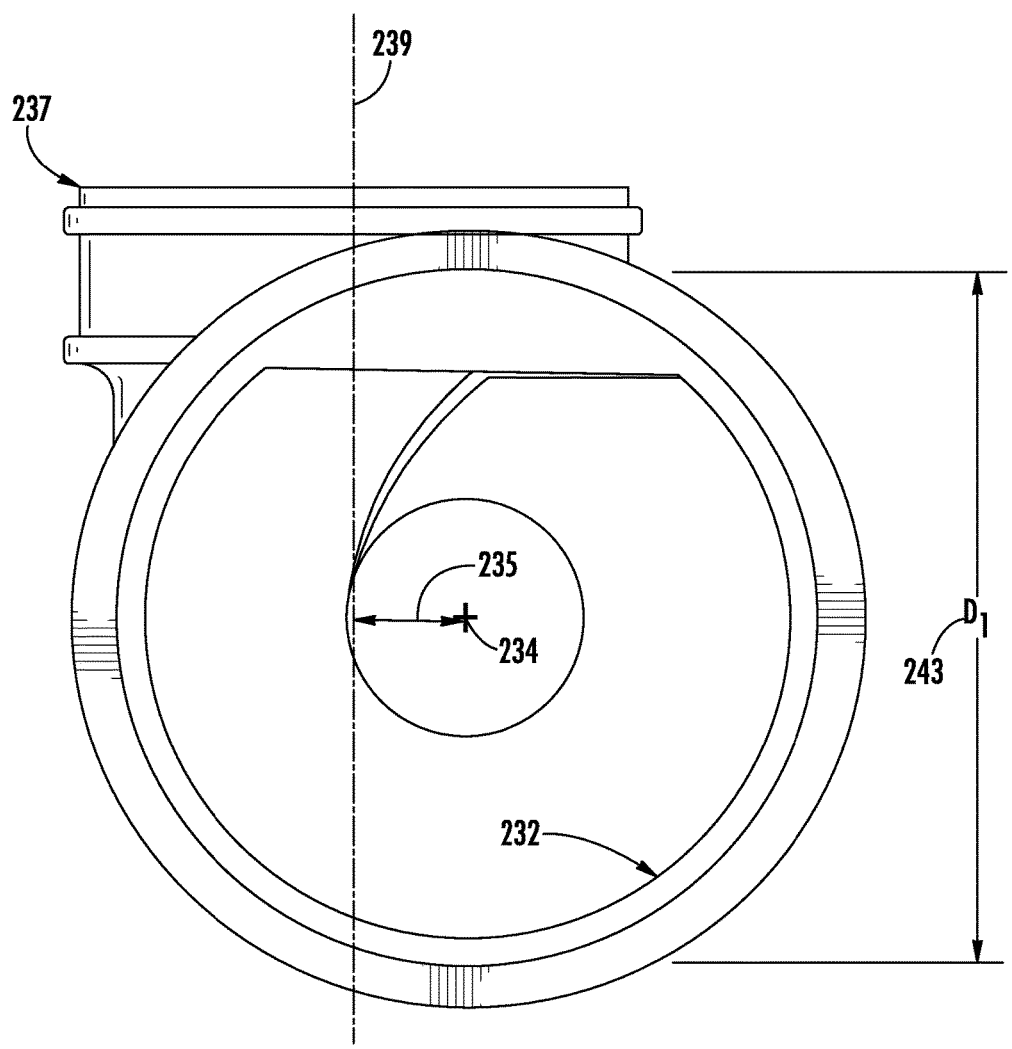
FIG. 6 is a plan view of the furnace inducer elbow of FIG. 4.
Figure 7:
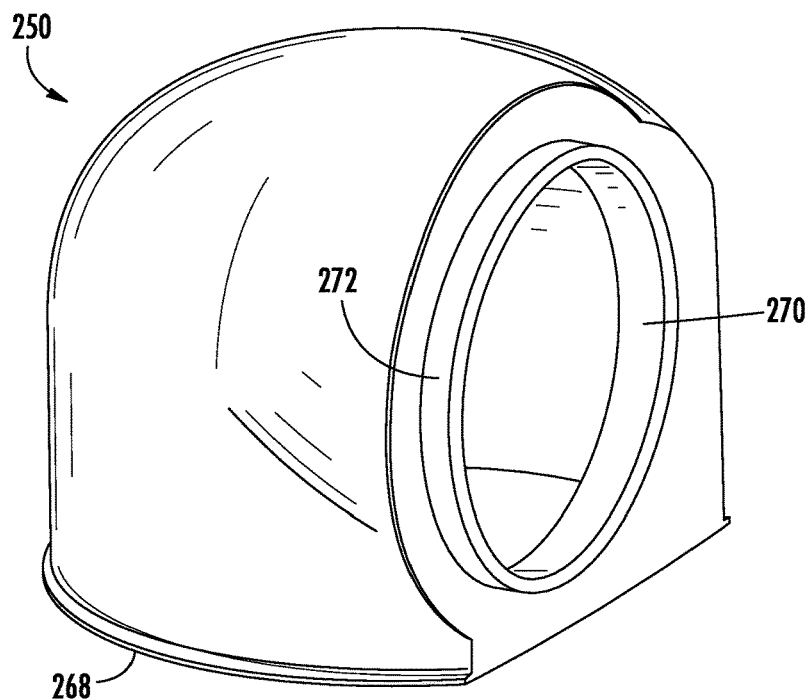
FIG. 7 is a perspective view of an embodiment of a main body section of the furnace inducer elbow of FIGS. 4 and 5.

Turning now to FIGS. 4-8, furnace inducer elbow 230 is depicted as a short radius ninety-degree)(90° pipe elbow having a center to end distance that is less than or equal to the nominal pipe size ("NPS") as will be discussed more fully below. In another embodiment, the center to end distance could be greater than the NPS. Furnace inducer elbow 230 includes an inlet 232 having an inlet centerline 234 and an outlet 237 having an outlet centerline 239. Inlet centerline 234 may be off-set from outlet centerline 239 so that the inlet and outlet centerlines 234, 239 do not intersect, as more clearly shown in FIG. 6. With reference to FIG. 6, the outlet centerline 239 is depicted passing through the outlet 237, while the inlet centerline 234 is depicted within the center of the inlet 232. By arranging the inlet centerline 234 off-set a desired distance 235 from outlet centerline 239, outlet 237 and flue vent 80 can be located so as to not interfere with other portions of gas furnace system 2. For example, in an upflow orientation, outlet 237 and flue vent 80 may be off-set relative to centerline 234. In this manner, flue vent 80 does not interfere with burner assembly 30. Thus, furnace inducer elbow 230 extends only a short distance from flue vent discharge portion 77. Depending on the configuration of the gas furnace system 2, the distance 235 may alternatively not be included, such that the inlet centerline 234 intersects with the outlet centerline 239, or may alternatively be positioned on an opposite side of the outlet centerline 239.

In addition, inlet 232 is formed having a first diameter 243 and outlet 237 is formed having a second diameter 245. In the embodiment shown, first diameter 243 is greater than second diameter 245 however it should be understood that first and second diameters 243 and 245 could be substantially similar or that the first diameter 243 could be less than the second diameter 245. Furnace inducer elbow 230 is further shown to include a first length 247 that established a distance from inlet 232 to a rear portion of the 90° bend, and a second length 249 that establishes a distance from outlet 237 to the back of the 90° bend. In accordance with one aspect of the embodiment, the first length 247 is equal to or substantially equal to second length 249. In accordance with another embodiment, the first length 247 is shorter than second length 249 to further ensure that furnace inducer elbow 230 extends only a short distance from flue vent discharge portion 77. In another embodiment, the first length 247 is longer than the second length 249.

The furnace inducer elbow 230 provides support to the flue vent 80 (FIG. 1), or other field venting system, while maintaining a gas-tight seal in order to ensure that all the flue products are discharged into the ambient. The furnace inducer elbow 230 also provides a path for liquid condensate that was formed in the flue 80 to drain back through the inducer fan housing 73 into the condensate drainage system, such as in collection zone 120 (FIG. 2). The furnace inducer elbow 230 is configured to allow the elbow 230 to be rotated axially on the discharge portion 77 of the inducer fan housing 73 (FIG. 2) to match the desired field installation orientation. Thus, the furnace inducer elbow 230 must transmit the flue gasses and drain condensate in multiple orientations. In the embodiments of furnace inducer elbow 230 described herein, to satisfy load bearing requirements as well as sealing requirements, the furnace inducer elbow 230 is a multi-material device. In one embodiment, the furnace inducer elbow 230 is made from two different materials. The furnace inducer elbow 230 includes a main body section 250, further shown in FIG. 7, formed of a first material (base material) having rigid and substantially inflexible characteristics. The furnace inducer elbow 230 further includes a sealing section 252, further shown in FIG. 8, formed of a second material (sealing material) having flexible characteristics. The first material is more inflexible than the second material, and likewise the second material is more flexible than the first material. The main body section 250 transitions flue gas flow to the desired orientation, and further transfers the load from the flue 80 to the inducer fan housing 73. To support this load, the main body section 250 includes the rigid, substantially inflexible, first material. In one embodiment, the first material includes an inflexible plastic, such as, but not limited to, one or more of polypropylene, rigid polyvinyl chloride, chlorinated polyvinyl chloride, acrylonitrile butadiene styrene, high density polyethylene, polycarbonate, and polybutylene terephthalate. One skilled in the art would understand additional plastics that may be used. The first material may include only one type of inflexible plastic, or may include a combination/blend of different inflexible plastics. Also, the first material may include an extra fill as needed or desired in addition to the inflexible plastic. In a preferred embodiment, the inflexible plastic is polypropylene. The inducer fan housing 73, which connects to the furnace inducer elbow 230, may also be made of the same inflexible plastic as the first material, such as polypropylene, and thus the first material is readily available for the production of the main body section 250. The main body section 250 further includes a first opening 268 in alignment with the inlet 232, thus sharing the same centerline 234, and a second opening 270 in alignment with the outlet 237 and sharing the same centerline 239. The furnace inducer elbow 230 is molded such that a flow path is created from the first opening 268 to the second opening 270. The first and second openings 268 and 270 may include any number of bond assisting areas, such as depicted at 272, to insure an adequate bond with the sealing section 252. The bond assisting areas 272 may include, but are not limited to, molded indents, shoulders, recesses, and lips.

The sealing section 252 is configured to seal the inlet 232 to the inducer fan housing 73 and configured to seal the outlet 237 to the flue vent 80. The role of the second material is to ensure that no gas or liquid can escape from the interior of the furnace inducer elbow 230. The second material maintains this seal while withstanding chemical attack from the acidic liquid condensate from the flue 80, and is more flexible than the first material. In one embodiment, the second material may include, but is not limited to, a flexible plastic. The flexible plastic may include one or more of thermoplastic elastomer ("TPE"), thermoplastic rubber, thermoplastic polyurethane, cross-linked polyethylene, and flexible polyvinyl chloride (with the addition of one or more plasticizers). One skilled in the art would understand additional plastics that may be used. The second material may include only one type of flexible plastic, or may include a combination/blend of different flexible plastics. Also, the second material may include an extra fill as needed or desired in addition to the flexible plastic. In a preferred embodiment, the flexible plastic is TPE. Also in one embodiment, when the flexible plastic is TPE (a physical mix of a rigid plastic and a rubber), the plastic within the TPE may be the same as the first material, for example, the TPE may include polypropylene and rubber. The second material of the sealing section 252 may have a similar hardness level and flexibility as that of the rubber material of the elbow 130, however the main body section 250 of the furnace inducer elbow 230 will be less flexible (and thus harder and more rigid) than the elbow 130.

Figure 8:
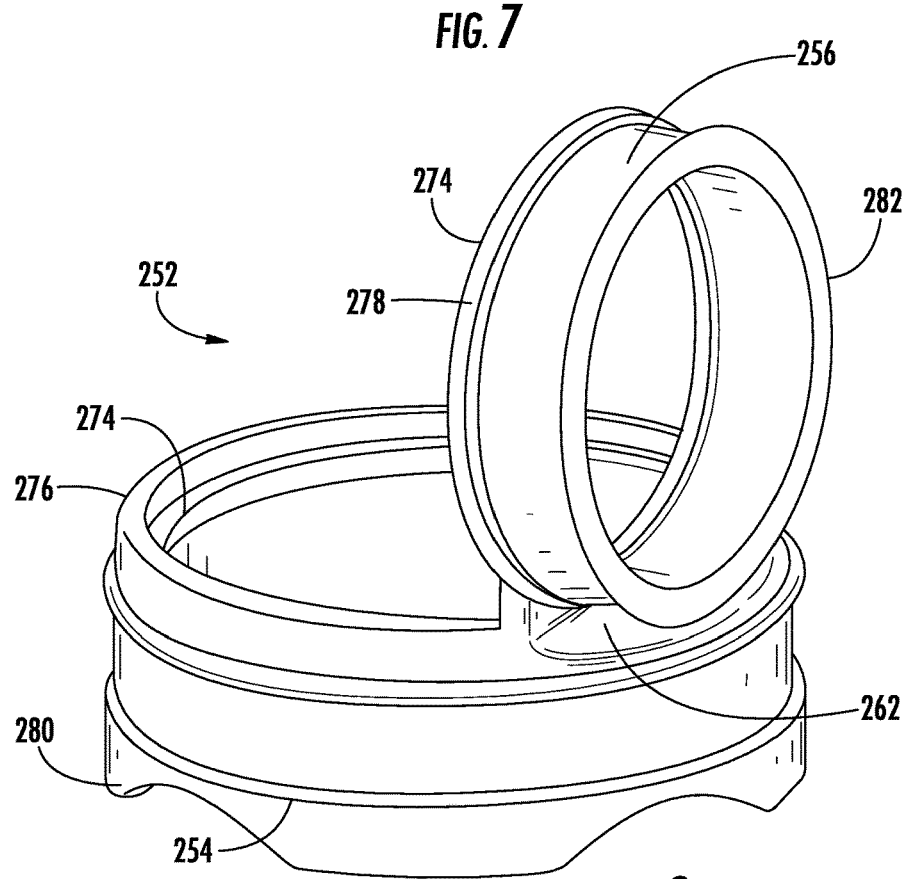
FIG. 8 is a perspective view of an embodiment of a sealing section of the furnace inducer elbow of FIGS. 4 and 5.

With additional reference to FIG. 8, the sealing section 252 includes a first section 254 integrally connected at a first end 276 to the main body section 250 at the first opening 268, and a second section 256 integrally connected at a first end 278 to the main body section 250 at the second opening 270. A second end 280 of the first section 254 and a second end 282 of the second section 256 define the inlet and outlet 232, 237, respectively, of the furnace inducer elbow 230. The integral connections between the first section 254 and second section 256 and main body section 250 form first and second bonded areas, shown generally at 258, 260 (FIGS. 4 and 5). The first section 254 and second section 256 may include any number of bond assisting areas 274 to mate with the bond assisting areas 272 of the main body section 250. The first section 254 and second section 256 may each be substantially ring-shaped as shown. A longitudinal length of the first section 254 (measured from first end 276 to second end 280) and second section 256 (measured from first end 274 to second end 282), as a percentage of the first and second lengths 247, 249, may be adjusted depending on the sealing requirements with the flue vent connecting portion 77 and flue vent 80. The second end 280 of the first section 254 may be scalloped as shown for assisting with the installation, although the first end 274 and second end 282 may have any shape suitable for mating with the flue vent connecting portion 77 and flue vent 80, respectively.

In order to create a watertight and airtight seal between the main body section 250 and the sealing section 252, the bonded areas 258, 260 may be integrally formed by partially melting and commingling the first and second materials at the intersections of the main body section 250 and the sealing section 252 during the manufacturing of the furnace inducer elbow 230. That is, during the molding process, the first material may be shot into a mold first to create the main body section 250 and may then be allowed to cool. Then, when the second material is shot into the mold and partially on top of the first material of the main body section 250, the first material will melt a second time and combine with the second material, such that when the first and second materials cool down, the bonded areas 258, 260 are formed. In one embodiment, the bonded areas 258, 260 may include a chemical bond between the first and second materials. The strength of the bonded areas 258, 260 in between the main body section 250 and the sealing section 252 is greater than the mechanical strength of the second material alone in the sealing section 252. Thus, the bonded areas 258, 260 allow the load to transfer through to the rigid main body section 250 without a separation occurring between the first and second materials of the main body section 250 and sealing section 252, respectively. The manufacturing process including the combination of the first and second materials results in the bonded areas 258, 260 having increased strength which is advantageous for supporting the load of the flue vent 80 and for the longevity of the elbow 230. The second material for both the first and second sections 254, 256 may be injected in one shot to take advantage of mold flow, thus integrally connecting the first and second sections 254, 256 of the sealing section 252 with a connecting portion 262. Further, when the first section 254 is integrally connected to the second section 256 of the sealing section 252, the furnace inducer elbow 230 is provided with a sealing section 252 that retains the main body section 250 therebetween, thus providing additional support to the furnace inducer elbow 230.

Figure 9:
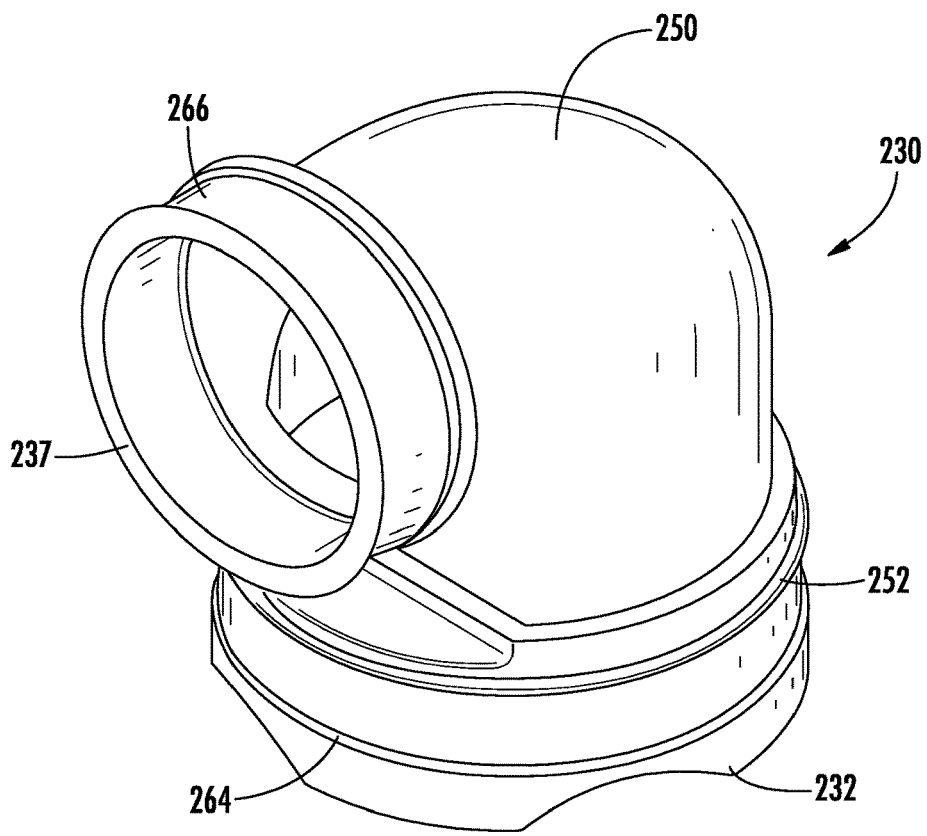
FIG. 9 is a perspective view of a furnace inducer elbow in accordance with another embodiment of this disclosure; and, FIG. 10 is a perspective view of an embodiment of a sealing section of the furnace inducer elbow of FIG. 9.
Figure 10:
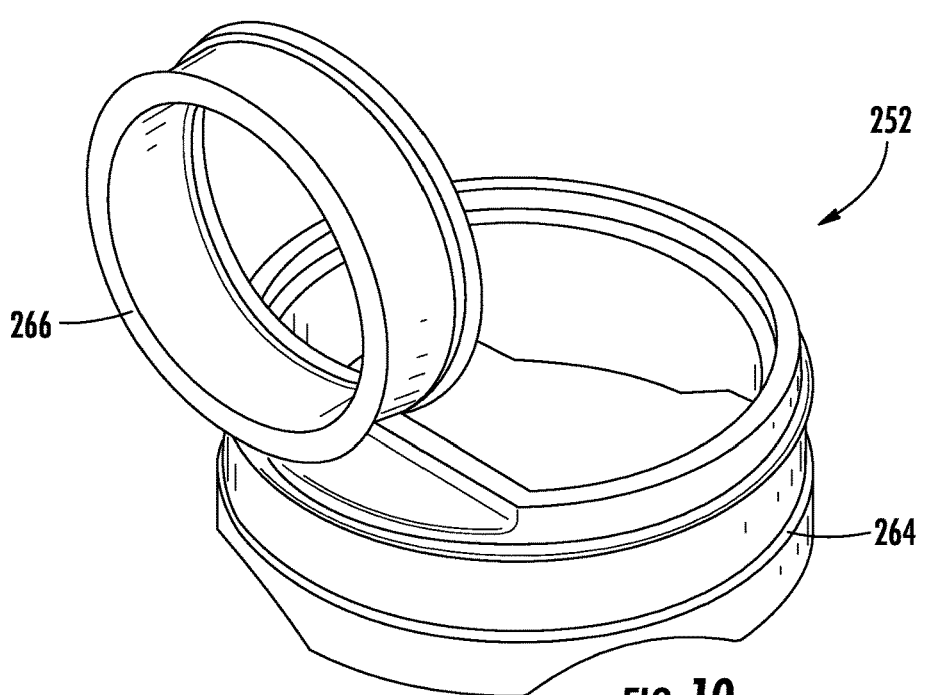

While advantages of the sealing section 252 integrally connecting the first section 254 to the second section 256 via connecting portion 262 may be had within the furnace inducer elbow 230 shown in FIGS. 4-5 and 8, in another embodiment the sealing section 252 may include a first section 264 separate and distinct from the second section 266, such as shown in FIGS. 9 and 10. This may be useful if a particular mold renders such a separate injection process simpler, or if a third material different from the second material is to be employed for either the first or second sections 264, 266.

An alternative manufacturing process may include a mechanical interlock between the main body section 250 and the sealing section 252. For example, the manufacturing process may include drilling or providing molded holes in the main body section 250 and subsequently injecting the second material of the sealing section 252 into the holes, such as from opposite sides, to mechanically interlock and secure the sealing section 252 relative to the main body section 250. Portions of the second material exterior of the holes may be larger than a diameter of the holes to insure that the sealing section 252 cannot be pulled out through the holes.

The furnace inducer elbow 230 provides an increase in strength over the elbow 130 while using less material. Since less material is required for mechanical strength, the furnace inducer elbow 230 requires less overall space which allows the furnace inducer elbow 230 to be employed in designs where tighter confines may be a requirement. Furthermore, the processing times during the molding process are shorter for the furnace inducer elbow 230 as compared to the elbow 130, which leads to cost benefits from a process improvement. That is, an elbow 130 made of rubber requires considerable more processing time than the furnace inducer elbow 230 made of plastics. Plastics can be molded and set in a much faster time period than rubber, which results in inevitable cost savings. In addition, due to the slower processing time of the rubber elbow 130, more tooling may be required for the rubber elbow 130 in order to keep up with demand, which adds additional expense. The material cost difference also provides a source of savings. Not only is plastic less expensive than rubber, but less plastic is required to produce the furnace inducer elbow 230 than rubber to produce the elbow 130 because the wall thickness of the furnace inducer elbow 230 can be less as compared to a wall thickness of the elbow 130, and the strengthening ribs of the elbow 130 are not required in the furnace inducer elbow 230. The furnace inducer elbow 230 allows backward compatibility as the furnace inducer elbow 230 may be formed with dimensions suitable for configuration with existing inducer fan assemblies.

At this point it should be understood that the embodiments provide a gas furnace system having an inducer fan assembly that includes a fan housing provided with a concentric discharge that extends axially outward. The concentric discharge allows for the release of flue gases and collection of flue gas condensate while maintaining a compact form factor. The compact form factor also provides installation flexibility for a multi-poise furnace. The incorporation of the furnace inducer elbow in combination with the axially extending discharge enables the flue vent to be routed in a variety of configurations depending upon desired installation orientation. Moreover, the embodiments enable easy modification in the field to change the gas furnace system from an initial configuration to a desired configuration without the need for substantial reconstruction.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A furnace inducer elbow comprising:
a main body section having a first opening and a second opening arranged at a non-zero angle from the first opening, the main body section made of a first material; and,
a sealing section coupled to the main body section at the first opening and at the second opening, the sealing section made of a second material different from the first material, wherein the second material is more flexible than the first material;
wherein the sealing section includes an inlet aligned with the first opening and configured to seal to a flue vent connection member of an inducer fan assembly, and the sealing section further including an outlet aligned with the second opening and configured to seal to a flue vent;
wherein the sealing section inlet includes a first section coupled to the main body section at the first opening wherein the first section surrounds the first opening, and the sealing section outlet includes a second section coupled to main body section at the second opening wherein the second section surrounds the second opening, the first section integrally connected to the second section; and
the sealing section comprises a unitary component with the first section beinq integrally connected to the second section by a connecting portion that lies in the bend of the elbow but exterior to the main body.

2. The furnace inducer elbow of claim 1 wherein the first material includes a substantially inflexible plastic.

3. The furnace inducer elbow of claim 2 wherein the first material includes polypropylene.

4. The furnace inducer elbow of claim 3, wherein the second material includes a thermoplastic elastomer.

5. The furnace inducer elbow of claim 2 wherein the second material includes a flexible plastic, having greater flexibility than the substantially inflexible plastic of the first material.

6. The furnace inducer elbow of claim 1 wherein the sealing section includes a first section integrally connected to the main body section at the first opening, and a second section integrally connected to the main body section at the second opening, the first section disconnected from the second section.

7. The furnace inducer elbow of claim 1 wherein a centerline of the inlet does not intersect with a centerline of the outlet.

8. The furnace inducer elbow of claim 1 wherein the non-zero angle is at least substantially equal to 90degrees.

9. The furnace inducer elbow of claim 1, wherein the sealing section includes a first section at the first opening and a second section at the second opening, and further comprising a first bonded area between the first section and the main body section and a second bonded area between the second section and the main body section, wherein the first and second bonded areas include a combination of the first and second materials, and the first and second bonded areas are less flexible than the sealing section.

10. The furnace inducer elbow of claim 1 wherein the sealing section is integrally connected to at least one of the first opening and the second opening by a chemical bond.

11. A gas furnace system comprising:
a heat exchanger;
an inducer fan assembly mounted to the heat exchanger, the inducer fan assembly having an inducer fan housing including a flue vent connection member configured and disposed to be connected to an exhaust gas flue vent, the flue vent connection member including a flue gas outlet and a flue vent condensate inlet; and
a furnace inducer elbow mounted to the flue vent connection member, the furnace inducer elbow including a main body section having a first opening and a second opening arranged at a non-zero angle from the first opening, the main body section made of a first material, and a sealing section integrally connected to the main body section at the first opening and at the second opening, the sealing section made of a second material different from the first material, the second material more flexible than the first material;
wherein the sealing section includes an elbow inlet aligned with the first opening and sealed to the flue vent connection member of the inducer fan assembly, and the sealing section further includes an elbow outlet aligned with the second opening and configured to seal to the flue vent;
wherein the sealing section inlet includes a first section coupled to the main body section at the first opening wherein the first section surrounds the first opening, and the sealing section outlet includes a second section coupled to main body section at the second opening wherein the second section surrounds the second opening, the first section integrally connected to the second section; and
the sealing section comprises a unitary component with the first section being integrally connected to the second section by a connecting portion that lies in the bend of the elbow but exterior to the main body.

12. The gas furnace system of claim 11, wherein the first material includes a substantially inflexible plastic.

13. The gas furnace system of claim 12, wherein the second material includes a flexible plastic, having greater flexibility than the substantially inflexible plastic of the first material.

14. The gas furnace system of claim 11, wherein a centerline of the elbow inlet does not intersect with a centerline of the elbow outlet.

\* \* \* \* \*